GAIN CONTROL APPARATUS PROVIDING CONSTANT GAIN INTERVAL

Filed Feb. 14, 1962 3 Sheets-Sheet 1

INVENTORS.
BENJAMIN B. BAUER &
ARTHUR KAISER
BY
Brumbaugh, Free, Graves & Donohue
their ATTORNEYS

GAIN CONTROL APPARATUS PROVIDING CONSTANT GAIN INTERVAL

Filed Feb. 14, 1962 3 Sheets-Sheet 2

INVENTORS.
BENJAMIN B. BAUER &
ARTHUR KAISER
BY
Brumbaugh, Free, Graves & Donohue
their ATTORNEYS

GAIN CONTROL APPARATUS PROVIDING CONSTANT GAIN INTERVAL

Filed Feb. 14, 1962

INVENTORS.
BENJAMIN B. BAUER &
ARTHUR KAISER
BY
Brumbaugh, Free, Graves & Donohue
their ATTORNEYS 3,187,268

GAIN CONTROL APPARATUS PROVIDING CONSTANT GAIN INTERVAL

Benjamin B. Bauer, Stamford, and Arthur Kaiser, Trumbull, Conn., assignors to Columbia Broadcasting System, Inc., New York, N.Y., a corporation of New York Filed Feb. 14, 1962, Ser. No. 173,281
11 Claims. (Cl. 330—123)

This invention relates to apparatus for automatically controlling the gain of a signal amplifying channel, and more particularly to amplifier gain control arrangements wherein audio frequency signals of wide dynamic range may be controlled to permit effective broadcasting or recording without producing any noticeable deterioration of the quality of the reproduced sound.

To enable broadcasting equipment, recording devices, and the like to accommodate the normal variation in volume of audio signals encountered in, for example, the entertainment field, it is usually necessary to alter the dynamic range of the signals. Besides the technical limitations imposed by the equipment, completely faithful reproduction of the live sound often is displeasing esthetically to the listener because of large variations in volume, and some form of gain alteration is desirable.

Various techniques have been used in broadcasting and recording studios to maintain the dynamic range of the audio signals within prescribed limits that can be accommodated by the broadcasting or recording equipment. All of these, whether they be manual or automatic, while being effective to limit the range applied to the equipment, have so severely altered the characteristics of the signal as to produce a noticeable change in the quality of the sound at the receiving or reproducing location. The large, random fluctuations in sound level and gaps in continuity encountered in normal broadcasts or recording operations present problems which heretofore were incapable of being satisfactorily dealt with. This is especially true in situations where the volume suddenly drops from a high level to one much lower, or when an extended silence occurs in a program, such as is often found in television broadcasting where visual effects render audio signals unnecessary.

In conventional gain control apparatus, changes in volume level are accompanied by compensating changes in gain, which often provide unrealistic and unpleasant variations to the listener, especially in situations where signal volume is rapidly changing over a wide range of levels. In the case of prolonged gaps in the audio input, ordinary gain control arrangements would cause amplification of background and studio noise to a degree where they would be heard by the listener.

Accordingly, it is the primary object of the present invention to provide improved gain control apparatus for broadcasting, recording, and the like, wherein the aforementioned disadvantages of existing apparatus are avoided.

A further object of this invention is to provide improved automatic gain control apparatus for signal amplifying apparatus wherein the undesirable effects resulting from large changes of signals are minimized to render the reproduced signal more esthetically pleasing to the listener.

Yet another object of this invention is to provide novel automatic gain control and limiting apparatus for an amplifier which overcomes the displeasing effect of sudden large drops in input signal level.

A still further object of this invention is to provide novel gain control and limiting arrangements for an amplifier in which gain control is suspended during prolonged gaps in input signal whereby increased amplification of background noise is avoided.

An additional object of this invention is to provide an improved gain control and limiting arrangement wherein an auxiliary response to short duration impulse sounds is provided to render such sound more artistically pleasing to the ear.

Briefly, the present invention utilizes what is termed the "platform" principle of gain control. In accordance with this type of operation, a reduction of signal level of predetermined amount is required to initiate an increase of gain. This is in contrast with continuous gain control where the gain tends to follow the signal amplitude contour. Thus, a constant gain "platform" is established permitting a range of signal variation without alteration to the amplifier gain and thereby eliminating effects displeasing to the human ear. In addition to the "level delay," the present invention introduces a time delay which serves to minimize gain increases caused by large volume decreases of short duration.

In accordance with a preferred embodiment of the present invention for use with the audio input channel of a broadcasting transmitter or for sound recording comprising at least one stage having a variable mu tube, a feedback arrangement having two paths is provided for generating gain control potentials. The first path includes a detector for rectifying the output signal of the amplifier and providing a D.C. voltage across a storage device such as a capacitor, which voltage is the gain control bias for the amplifier stage. The second path includes a similar detector but is arranged to provide a D.C. potential of greater magnitude than that of the first-mentioned path. The latter detector is coupled to the aforementioned storage device by comparison means. Below a predetermined signal level, no rectification occurs in the detector of the first feedback path and the amplifier operates at a constant gain point determined by its initial bias conditions. Once this predetermined level is reached however, rectification takes place and a voltage is developed across the storage device. The stored voltage is applied to the amplifier to decrease its gain in proportion to the increase in signal level above the predetermined level and signal limiting results.

Upon a decrease in signal level, the output of the second detector, which is applied to the comparison means, prevents a change in the voltage across the storage device until a predetermined drop in signal level has occurred. Once this drop is exceeded, the comparator permits the first detector circuit to alter the control voltage and increase the gain of the amplifier. As an additional feature, a gating circuit is provided which effectively disconnects the second feedback circuit from the gain control apparatus during periods of prolonged silence, thus preventing any increase in amplifier gain. Immediately upon resumption of audio input, the gate is discontinued and the above-described gain control function is resumed.

The aforementioned objects, features and advantages of the present invention will become more apparent from the following detailed description thereof when taken in conjunction with the accompanying drawings in which.

Figures 1, 2:
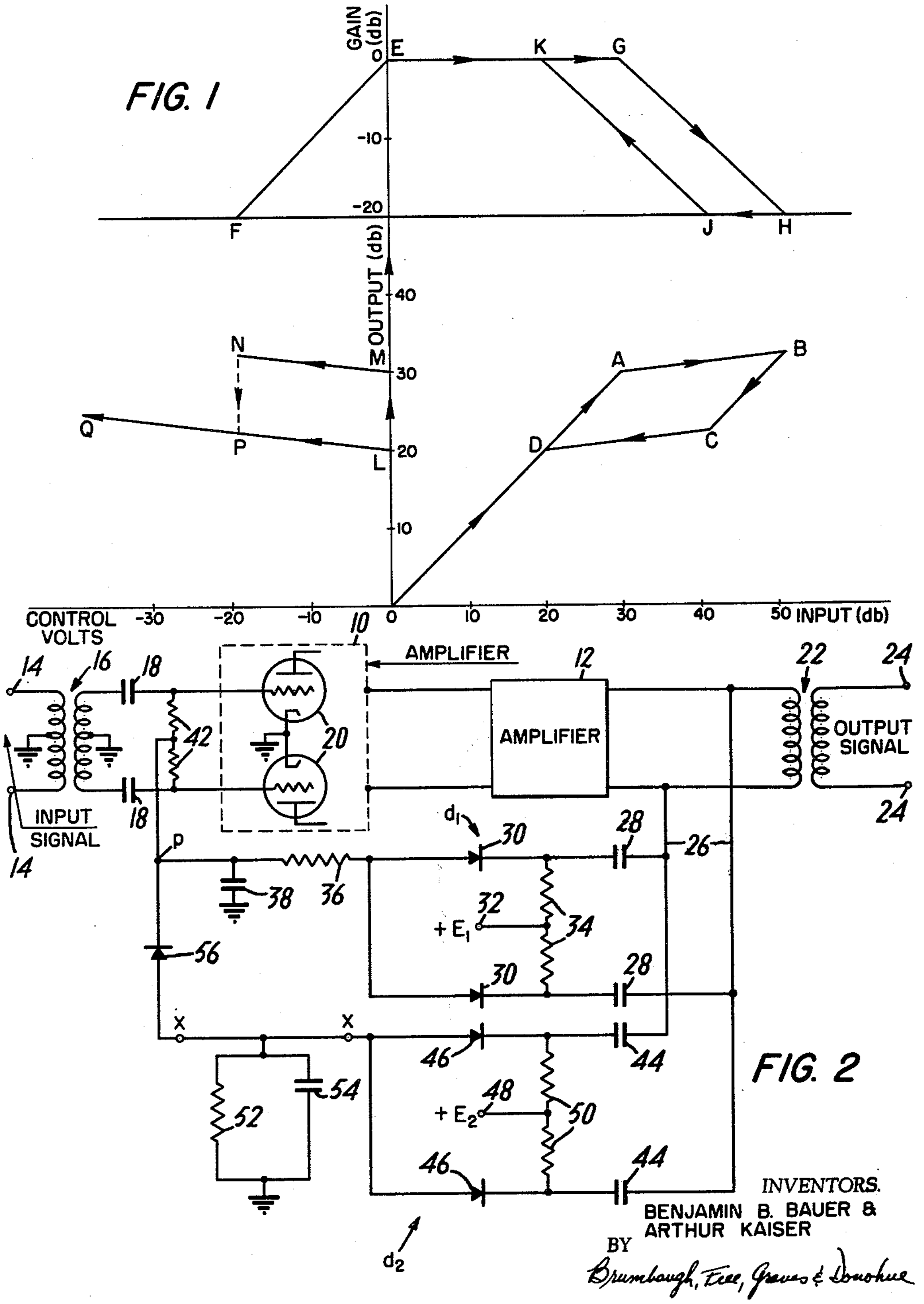
FIGURE 1 is a chart explaining the theory of operation of the present invention.
FIGURE 2 is a circuit diagram of a basic arrangement in accordance with the present invention.

Operation of the novel gain limiting apparatus of the present invention may be more fully understood by consideration of the chart of FIGURE 1. The lower right hand portion of the chart is a plot of Output signal level versus Input signal level (in db) of the amplifier utilizing the gain control device. For purposes of illustration, assume an audio input signal that starts at 0, increases to approximately 50 db, and then decreases to 0. Beginning at the origin O, the amplifier operates along a straight line to point A, through point D. As shown, this line is approximately at 45°, indicating a constant gain characteristic over this range. Although this is a preferable manner of operation, other slopes, indicating other gain characteristics, may equally be accommodated by the present invention. At point A, the limiting action of the control arrangement takes effect, thereafter decreasing the gain of the amplifier as the input signal increases.

Point B represents the point at which the decrease in signal input begins. In accordance with conventional gain control apparatus, decreasing input signal would cause the gain to return along the line BAD and then back to the origin O. However, with the present invention, the drop in input signal level is not immediately accompanied by an increase in gain but rather the output of the amplifier proceeds along the constant gain line BC until the output level drops approximately 10 db. At that time, point C, the gain increases along the line CD and thereafter follows the line DO.

The variation in gain may be more readily seen from the plot in the upper right hand segment of the chart, in which Amplifier Gain in db is plotted against Input, also in db. The gain is constant from point E through K to point G as the input signal increases, corresponding to the line OA in the lower portion of the chart. When the limiting level is reached, the gain decreases along the line GH. Upon decrease in signal level, a gain platform is established represented by the constant gain line HJ corresponding to the line BC. When the platform width is exceeded by the decrease in signal level, the gain increases along the line JK thence back along the constant gain line to point E. By providing the constant gain segment or platform HJ, an abrupt increase in gain as a signal is decreased is avoided and the total result is to provide a sound more pleasing to the human ear.

A circuit for controlling the gain of an amplifier in accordance with the chart of FIGURE 1 is illustrated in FIGURE 2. An audio signal transmission channel, suitable for use as a broadcast transmitter input or as the input to a recording apparatus, may conveniently consist of a pair of amplifier stages 10 and 12, one of which is provided with a variable gain feature. As illustrated in the drawing, the amplifier 10 is indicated as being of the push-pull type including a pair of amplifier tubes 20 having a variable gain characteristic, e.g. type 6386, and whose outputs are supplied to succeeding circuitry in the amplifier. For the sake of simplicity, the details of the amplifier 10 are omitted, it being obvious that one skilled in the art could supply the required circuitry.

Audio input signals, such as from a microphone, are applied across the input terminals 14. Transformer 16 couples the input signals through D.C. blocking capacitors 18 to the respective input grids of the tubes 20 in conventional push-pull fashion. The output of amplifier 10 provides the input to the additional amplifier 12 whose output is coupled via transformer 22 to the output terminals 24. Referring again to the upper left hand corner of the chart of FIGURE 1, the variable gain tubes 20 of amplifier 10, type 6386, are seen to have straight line characteristics providing approximately one db gain for each volt of control voltage. It will be apparent that other gain characteristics may also be used in the amplifier.

The gain control circuitry comprises a first feedback loop including conductors 26 coupling the output of amplifier 12 through coupling capacitors 28 to the cathodes, or negative electrodes, of a pair of rectifying devices 30. These diodes may be either of the thermionic or semi-conductor variety and have their positive terminals connected in common to form a full wave rectifier $d_1$. A source of positive D.C. voltage $+E_1$ is coupled at terminal 32 and through resistors 34 to the respective cathodes of the diodes 30. The common connection of the diodes 30 is coupled through resistor 36 to one side of a voltage storage capacitor 38, the other terminal of which is grounded. The capacitor is also coupled at point $p$ and via conductor 40 to the mid-point of a voltage divider comprising resistors 42 connected in series across control grids of the amplifier tubes 20.

As long as the output of amplifier 12 is of a magnitude less than the value $+E_1$, no conduction takes place through the diodes 30 and no control voltage is applied to the tubes 20. The latter will then operate at a constant gain point established by the initial biasing conditions. When the output voltage reaches a peak value exceeding the value $+E_1$, the diodes 30 are rendered conductive on the negative peaks of the signal and rectification thereof occurs. The negative voltage resulting therefrom charges capacitor 38 quickly through resistor 36 and applies a control potential through resistors 42 to the amplifier tubes 20.

As can be seen from the Gain versus Control Voltage characteristic on the chart of FIGURE 1, an increase of negative control voltage causes a proportional decrease in gain of the amplifier. The gain limiting point, represented by point A in the output versus input curve in FIGURE 1, is therefore set by selection of the magnitude of $+E_1$. The values of capacitor 38 and resistor 36 are selected to provide a time constant enabling the charge on the capacitor to closely follow the D.C. voltage output of detector $d_1$.

Disregarding for a moment the remainder of the circuit, to be described hereinafter, should the input signal level now drop, no change in control voltage applied to tubes 20 will occur, since no discharge path for the capacitor 38 is available. Capacitors 18 prevent current flow from capacitor 38 through the transformer 16 and the polarities of the diodes 30 prevent current flow back therethrough. Accordingly, the control voltage will effectively be stored in capacitor 38 at the maximum value reached.

To provide the platform action and to permit the gain to increase upon a decrease in input signal, an auxiliary feedback loop is provided. This loop includes a peak detector arrangement, indicated generally at $d_2$, similar to the detector $d_1$. Conductors 26 apply the output audio signal through D.C. blocking capacitors 44 to the cathode terminals of the diodes 46. A source of positive voltage $+E_2$ is applied at terminal 48 and thence through equal resistors 50 to the cathodes of the diodes.

The anodes of the rectifying devices 46 are connected in common to provide full wave rectification and are coupled to one terminal of a parallel RC network comprising resistor 52 and capacitor 54, the other terminals of which are connected to ground. A uni-directional conducting device 56, such as a semi-conductor diode for example, is connected between the output of the rectifier $d_2$ and the point $p$, the device being poled so as to be conductive only when the output of $d_2$ is more positive than the potential at point $p$.

To establish the platform, the voltage $+E_2$ is made smaller i.e., less positive, than the voltage $+E_1$, in practice $+E_2$ being approximately ⅓ the value of $+E_1$ for a 10 db platform. Since both rectifiers $d_1$ and $d_2$ are provided with the same input signal, it will be apparent that the rectifier $d_2$ will develop a negative voltage at lower signal levels than rectifier $d_1$ and its output will always be more negative than the output of $d_1$ for the same values of amplifier output signal. Capacitor 54 is charged to a value corresponding to the rectified voltage but the output of this circuit is effectively isolated from the amplifier control grids by diode 56. By virtue of the leakage path through resistor 52 to ground, the charge on capacitor 54 will vary with the level of the output of the amplifier, both up and down, in contrast to the capacitor 38, which has no such discharge path and tends to maintain its charge constant at its maximum acquired value.

Assume now that the input signal level decreases by a substantial amount. This, of course, is accompanied by a corresponding drop in output signal level and consequently, a change in the feedback signal levels applied to detectors $d_1$ and $d_2$. As the signal inputs to the rectifiers $d_1$ and $d_2$ decrease, the negative D.C. levels developed thereby similarly decrease. However, as noted above, the capacitor 38, having no discharge path, retains the maximum voltage that had been applied across it. Capacitor 54 on the other hand, discharges through resistor 52 and the voltage thereacross follows the output of the rectifier $d_2$. Since $+E_2$ is smaller in magnitude than $+E_1$, the voltage developed across capacitor 54 will remain greater than that developed across capacitor 38 even after the signal level has decreased below the level which generated the peak voltage across capacitor 38.

As the input to rectifier $d_2$ continues to decrease in magntude however, a point is reached at which the output of the rectifier $d_2$ becomes equal to the voltage stored in capacitor 38. At this point, diode 56 becomes forward biased and is able to conduct. A discharge path for capacitor 38 is now provided through diode 56 and resistor 52 and its rate of discharge is dependent upon the time constant of the resistor 52 and capacitor 54. As the capacitor 38 discharges, the control voltage applied to the tubes 20 similarly becomes more positive and the gain of the amplifiers is increased.

Between the commencent of the decrease in signal level and the beginning of the discharge of the capacitor 38, the control voltage of the amplifier is held constant at the peak value stored in capacitor 38 and a gain platform is obtained. This corresponds to the line HJ in FIGURE 1, reflecting the Output vs. Input relationship of line BC.

The above described operation can be more clearly seen from the Output vs. Control Voltage plot in the lower left hand segment of the chart of FIGURE 1. The control voltage remains at zero as the output signal rises from point O through point L. At L, the detector $d_2$ begins to develop a negative potential, indicated by the line LPQ. When the limiting value M is reached, indicating that the output signal has reached the value $+E_1$, a control voltage represented by line MN is generated by detector $d_1$.

At point N, corresponding to B in the Output vs. Input plot, the signal level begins to drop. The voltage developed by $d_2$ begins to return along the line QPL towards zero. The control voltage however, remains the same as the output level drops approximately 10 db to P. The control voltage then decreases along line PL together with the voltage produced by detector $d_2$. It will be obvious that if the decrease in signal level is less than 10 db, no change in control voltage is effected.

Figure 5:
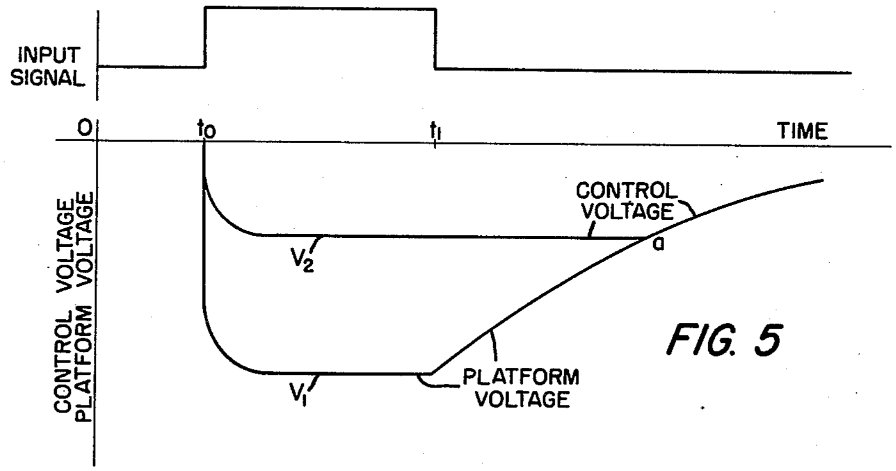
FIGURE 5 is a waveform diagram useful in explaining the platform of the present invention.

FIGURE 5 is a waveform diagram indicating the operation of the platform limiting circuit of FIGURE 2 on a time reference. For illustrative purposes, the input signal is chosen to have an envelope substantially rectangular in shape. Assuming initial conditions of no input voltage and no residual charge on any of the capacitors in the circuit, at time $t_0$ an increase in input signal level above the magnitude of $+E_2$ charges the capacitor 54 to a negative voltage represented by $v_1$. The time required to reach this value is determined by the charge-up time constant of the capacitor 54.

At the same time, the capacitor 38 is charging to a smaller negative voltage represented by $v_2$, the charging time being determined by the magnitudes of resistor 36 and capacitor 38. With the input signal remaining substantially constant for a period of time, the control voltage will also remain constant at the value of the voltage stored in capacitor 38. At this time, the amplifier will be operating at a point along the curve AB of FIGURE 1.

At the time $t_1$, the input signal drops substantially in level. The voltage across capacitor 54 immediately starts to increase in the positive direction at a rate dependent upon the magnitude of its time constant with resistor 52. Capacitor 38 retains its charge however, since diode 56 remains reverse biased. At point $a$ on the curve, the voltage across capacitor 54 becomes equal to that across capacitor 38 and the latter commences its discharge. The discharge then continues along the time constant curve until capacitor 38 is completely discharged or until another change in signal level occurs.

By proper selection of the relative magnitudes of $E_1$ and $E_2$, the size of the platform may be determined. In the practical embodiment mentioned briefly above, $E_2$ was selected to be approximately ⅓ of $E_1$, to provide a gain platform on the order of 10 db. It was found that this value of platform provides esthetic qualities most pleasing to the ear of the listener. In addition, the small time delays provided by the time constant circuits further smooth out abrupt gain changes to enhance the overall effect.

From consideration of the foregoing, it will be seen that in addition to producing sound more pleasing to the human ear, the present invention also enables broadcasting equipment to operate with increased efficiency. By virtue of the improved limiting action, average modulation is increased to permit greater radiated power with the same carrier source.

The circuit of FIGURE 2 may be modified for more effective use in television broadcasting, motion picture recording, etc. where extended periods of no audio input often occur and continuity is maintained solely by visual action. The effect of automatic gain control apparatus would be to increase the gain of the amplifier to its maximum level during these periods, at which point objectionable background noise would be amplified and transmitted or recorded, providing a displeasing effect to the listener. To prevent operation in this manner, the gain control circuit may be modified by the addition of a gating circuit indicated generally at 57 in FIGURE 3. In all other respects, the circuit is identical to that of FIGURE 2 and like reference numerals are used therein.

The gating circuit 57 enclosed within the dotted line is connected by conductors 58 to receive a portion of the input signal to the amplifier 10. The signal is coupled via blocking capacitors 62 and complementary voltage controlling potentiometers 64 to the input of a high gain push-pull amplifier 60 whose output is connected through coupling capacitor 66 to the anodes of a pair of unidirectionally conducting devices 68, which may be diodes of either the thermionic or semiconductor type. A source of negative D.C. voltage, $-E_3$, is coupled to terminal 70 and via equal resistors 72 to the positive terminals or anodes of the diodes 68.

The cathodes of the diodes 68 are connected in common to provide full wave rectifier action and the rectified output is connected to one terminal of a parallel RC combination comprising resistor 74 and capacitor 76, the other terminal 78 being returned to the voltage source $-E_3$. The upper terminal of the RC circuit is connected to the negative electrode or cathode of a semi-conductor diode 80, the anode of which is coupled to the anode of the semi-conductor diode 56.

As long as the input signal exceeds a threshold level selected by an adjustment of complementary potentiometers 64, high gain amplifier 60 provides an input to the diodes 68 which, by virtue of their positive rectification provide a high positive voltage at the upper terminal of the RC network 74, 76. Amplifier 60 is designed to provide sufficient amplification so that its output, when rectified by diodes 68 and added to $-E_3$, will be more positive than the output of $d_2$ for any value of signal input above the threshold. Under these conditions, in the presence of a signal above the threshold level, diode 80 is reverse biased and the gate network is effectively isolated from the remainder of the circuit. The platform circuit is thus free to operate in the manner discussed with respect to FIGURE 2.

Should the input signal decrease to a value below the threshold level, capacitor 76 discharges through resistor 74 to voltage level $-E_3$, applying a negative voltage to the cathode terminal of the diode 80 and rendering it conductive. This lowers the potential at the anode of diode 56 below its cathode potential thereby forcing capacitor 38 to maintain its charge and hold the gain of amplifier 10 at a constant value. The gate arrangement thus effectively suspends the platform operation during prolonged periods of little or no input signal.

When input signals above the threshold level resume, the output of amplifier 60 is rectified to charge small capacitor 76 quickly to a high positive value, thereby reverse biasing diode 80 and permitting the remainder of the circuit to function in its normal manner. The gating circuit will remain effectively out of operation until another lapse in input signal occurs. It will be appreciated that the time constant of the RC network 74, 76 will determine the delay in operation of the gate, both with respect to turn-on and turn-off. This time constant is preferably made small to permit rapid response of the gate.

Figure 3:
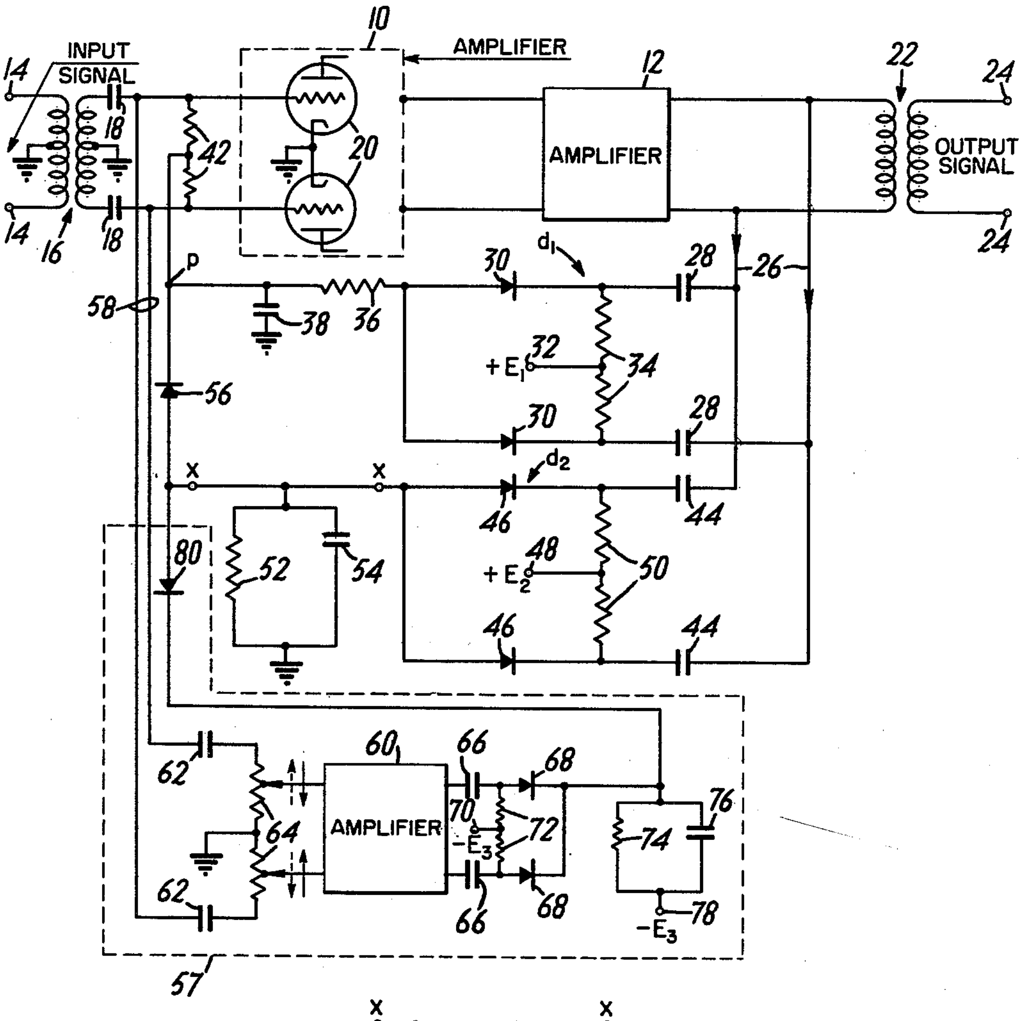
FIGURE 3 is a circuit diagram of the gain control arrangement including the gating feature.
Figure 4:
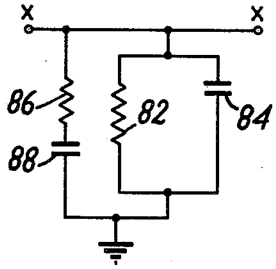
FIGURE 4 is a modification of a portion of the circuit useable with the apparatus of both FIGURES 2 and 3.

A modification of the basic circuit suitable for use with the circuit of both FIGURE 2 and FIGURE 3 is illustrated in FIGURE 4 and comprises essentially a variation of the time constant network inserted in the platform feedback loop between the terminals *x—x*. Instead of the simple parallel RC combination 52, 54, a dual mode circuit is provided which includes a parallel RC circuit 82, 84 across which is provided a series network consisting of resistor 86 and capacitor 88.

Figure 6:
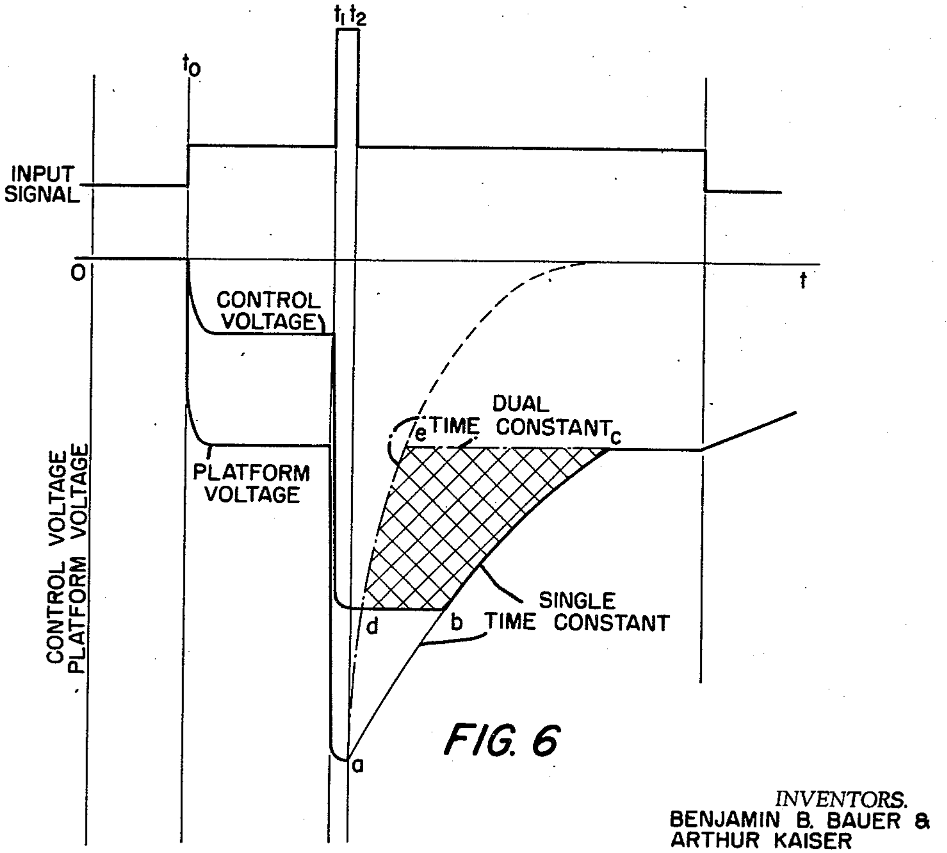
FIGURE 6 is a waveform diagram explaining the operation of the modification of FIGURE 4.

Operation of the modification of FIGURE 4 will be explained in conjunction with the waveform diagram of FIGURE 6. Assume a short, high amplitude input signal, such as representing a gun shot, appears in the input signal as at $t_1$. In accordance with the discussion of operation of the circuit of FIGURE 2 above, a control voltage and platform voltage will be developed as indicated. In the case of the single time constant circuit of FIGURE 2, at any time $t_2$, when the end of the impulsive sound occurs, the platform effect would cause the control voltage to remain constant while the platform voltage decayed from *a* to *b* and thereafter both control and platform would decay from *b* to *c*. The curve *bc* represents the normal recovery speed after the platform has been passed. The prolonged reduction of gain during the interval from *a* to *b* represents a penalty imposed by the short pulse upon the main body of program.

With the modification of FIGURE 4, the main body of program will have caused capacitor 88 to be fully charged through resistor 86 to produce the platform voltage existing immediately prior to the pulse. Because of its limited duration, the pulse will not cause capacitor 88 to assume additional charge. Capacitor 84, being considerably smaller than capacitor 88, will be charged during the pulse. At time $t_2$, because of the time constant of resistor 82 and capacitor 84, recovery of the platform voltage will proceed along curve *ade*, with the result that the gain of the amplifier is more nearly that which would be required for the main body of program. The shaded area *decb* represents the improvement obtained. With signals of extended duration, operation of the platform is exactly as described without this modification. The dual time constant platform circuit, therefore, provides for rapid gain recovery for short duration sound impulses while at the same time permitting slower action with respect to normally encountered signal variations.

Since most high quality audio equipment is operated push-pull, the circuit of the present invention has been shown arranged for use therewith. It will be apparent to those skilled in the art that single-ended operation may readily be effected, where desired, by substituting half wave rectifiers for the full wave circuits shown. It will also be apparent that the invention may be readily adapted to stereophonic systems.

Furthermore, although the apparatus of the invention has been described as being responsive to the output of the gain controlled amplifier, the principles thereof may be readily applied to provide gain control apparatus responsive to the input signal level.

While the invention has been particularly shown and described with reference to preferred embodiments thereof, it will be understood by those skilled in the art that various modifications in form and details may be made therein without departing from the spirit and scope of the invention as set forth in the appended claims.

What is claimed is:

1. A gain control arrangement for a variable gain amplifier comprising, first and second detector means both responsive to the same signal output voltage provided by said amplifier for developing unidirectional potentials having magnitudes respectively proportional to the magnitudes of said amplifier signal output voltage above first and second different predetermined levels, said first level being higher than said second level, storage means for retaining a potential equal to the unidirectional potential developed by said first detector means and for applying said retained potential to said amplifier to control the gain thereof, and circuit means including a unidirectionally conducting device connecting the output of said second detector means to said storage means for preventing a decrease in said retained potential until the output of said amplifier has diminished by a preselected value determined by the difference between said first and second predetermined levels.

2. A gain control arrangement for a variable gain amplifier according to claim 1, further comprising means actuated in response to a decrease in amplitude of the signal input to said amplifier below a threshold level for rendering said gain control arrangement ineffective.

3. A gain control arrangement for a variable gain amplifier according to claim 1, further comprising gate means coupled to receive input signals applied to said amplifier and inoperative in response to said input signals when above a predetermined threshold but responsive to input signals below said threshold level for rendering said gain control arrangement ineffective.

4. A gain control arrangement for a variable gain amplifier comprising, first and second detector means both responsive to the same signal output voltage provided by said amplifier for developing unidirectional potentials having magnitudes respectively proportional to the magnitudes of said amplifier signal output voltage above first and second different predetermined levels, storage means for retaining a potential equal to the unidirectional potential developed by said first detector means and for applying said retained potential to said amplifier to control the gain thereof, a time constant network connected across the output of said second detector means, and a unidirectionally conducting device connecting the output of said second detector means to said storage means for preventing a decrease in said retained potential until the output of said amplifier has diminished by a preselected value determined by the difference between said first and second levels, the time of initiation of the decrease in said retained potential and the rate of decrease being determined by the time constant of said network once said preselected value has been exceeded.

5. A gain control arrangement according to claim 4 wherein said time constant network comprises a parallel resistor-capacitor combination.

6. A gain control arrangement for a variable gain amplifier comprising, first and second detector means responsive to the output of said amplifier for developing unidirectional potentials having magnitudes respectively proportional to the magnitudes of the amplifier output above first and second predetermined levels, storage means for retaining a potential equal to the unidirectional potential developed by said first detector means and for applying said retained potential to said amplifier to control the gain thereof, a time constant network including a first portion having a relatively fast response in parallel with a second portion having a relatively slow response connected across the output of said second detector means, and a unidirectionally conducting device connecting the output of said second detector means to said storage means for preventing a decrease in said retained potential until the output of said amplifier has diminished by a preselected value determined by the difference between said first and second levels, the time of initiation of the decrease in said retained potential and the rate of decrease being determined by the time constant of said network once said preselected value has been exceeded.

7. A gain control arrangement according to claim 6 wherein said first portion comprises a series resistor-capacitor combination and said second portion comprises a parallel resistor-capacitor combination.

8. A gain control arrangement for a variable gain amplifier comprising, first and second detector means both responsive to the same signal output voltage provided by said amplifier for developing unidirectional potentials having magnitudes respectively proportional to the magnitudes of said amplifier signal output voltage above first and second different predetermined levels, a capacitor coupled to the output of said first detector means for storing a potential equal to the maximum potential developed by said first detector means, means for applying the potential stored in said capacitor to said amplifier to control the gain thereof, and means including a unidirectionally conducting device coupled between said capacitor and the output of said second detector and poled to be conductive in a direction to provide a discharge path for said capacitor when the output of said amplifier output decreases a preselected amount below the value at which said maximum unidirectional potential is developed, said preselected amount being determined by the difference between said first and second predetermined levels.

9. A gain control arrangement according to claim 8 wherein said amplifier is of the push-pull type and said first and second detectors comprise full wave rectifiers.

10. A gain control arrangement for a variable gain amplifier comprising, first and second detector means responsive to the output of said amplifier for developing unidirectional potentials having magnitudes respectively proportional to the magnitudes of the amplifier output above first and second predetermined levels, a capacitor coupled to the output of said first detector means for storing a potential equal to the maximum potential developed by said first detector means, means for applying the potential stored in said capacitor to said amplifier to control the gain thereof, means including a unidirectionally conducting device coupled between said capacitor and the output of said second detector and poled to be conductive in a direction to provide a discharge path for said capacitor when the output of said amplifier output decreases a preselected amount below the value at which said maximum unidirectional potential is developed, said preselected amount being determined by the difference between said first and second predetermined levels, an additional unidirectionally conducting device having one terminal thereof connected to the output of said second detector, and means responsive to input signals to said amplifier of less than a selected minimum amplitude for rendering said additional unidirectionally conducting device conductive, whereby said discharge path for said capacitor is blocked.

11. A gain control arrangement according to claim 10 wherein said input signal responsive means includes a source of negative potential coupled to said unidirectionally conducting device whereby said device tends to be rendered conductive, means including an amplifier responsive to input signals above said minimum amplitude to provide a positive potential, and means combining said negative and positive potentials to provide a net potential sufficient to maintain said additional device non-conductive.

References Cited by the Examiner

UNITED STATES PATENTS

| | | | |
|---|---|---|---|
| 2,585,890 | 2/52 | Wolfe | 330—134 |
| 2,925,476 | 2/60 | Atlas | 330—138 X |

FOREIGN PATENTS

| | | |
|---|---|---|
| 807,780 | 1/59 | Great Britain. |

ROY LAKE, *Primary Examiner.*

JOHN KOMINSKI, *Examiner.*